(12) United States Patent
Johnson et al.

(10) Patent No.: US 10,202,149 B1
(45) Date of Patent: Feb. 12, 2019

(54) ATV/UTV SKID PLATE ASSEMBLY

(71) Applicant: Super ATV, LLC, Madison, IN (US)

(72) Inventors: Steve Johnson, Underwood, IN (US); Kyle Kempker, Hanover, IN (US)

(73) Assignee: Super ATV, LLC, Madison, IN (US)

( * ) Notice: Subject to any disclaimer, the term of this patent is extended or adjusted under 35 U.S.C. 154(b) by 0 days.

(21) Appl. No.: 15/674,858

(22) Filed: Aug. 11, 2017

(51) Int. Cl.
*B60J 7/00* (2006.01)
*B62D 21/02* (2006.01)
*B62D 25/20* (2006.01)
*B62D 29/00* (2006.01)
*B62D 27/02* (2006.01)

(52) U.S. Cl.
CPC ......... *B62D 21/02* (2013.01); *B62D 25/2072* (2013.01); *B62D 29/001* (2013.01); *B62D 27/02* (2013.01)

(58) Field of Classification Search
CPC ... B23Q 5/28; Y10T 409/309576; A47B 9/04; B60T 8/17616; B60T 8/17636; B29C 66/71; G01B 7/28; A01D 41/14; A47L 11/30; A47L 11/4019
USPC .................................................. 296/204, 29
See application file for complete search history.

(56) References Cited

U.S. PATENT DOCUMENTS

| | | | | |
|---|---|---|---|---|
| 2,332,326 A | * | 10/1943 | Lex ...................... | B62D 63/062 280/149.2 |
| 2,882,889 A | * | 4/1959 | Shiplet ..................... | F23G 7/10 126/271.2 A |
| 4,852,756 A | * | 8/1989 | Holladay ............... | B65D 19/20 206/335 |
| 5,413,052 A | * | 5/1995 | Breezer .............. | B65D 19/0012 108/56.1 |
| 5,518,261 A | * | 5/1996 | Godbersen ............ | B60P 3/1033 280/402 |
| 6,681,489 B1 | * | 1/2004 | Fleming ................. | B62D 21/12 280/785 |
| 2002/0127072 A1 | * | 9/2002 | Stengele ................ | B23Q 1/623 409/191 |
| 2005/0269468 A1 | * | 12/2005 | Gough ..................... | B62B 5/00 248/300 |
| 2013/0098858 A1 | * | 4/2013 | Cusson .................. | A47B 47/00 211/189 |
| 2014/0270601 A1 | * | 9/2014 | Chen ..................... | F16C 29/001 384/15 |
| 2014/0375080 A1 | * | 12/2014 | Bermes ................. | B60P 7/0807 296/186.5 |
| 2015/0151577 A1 | * | 6/2015 | Tipton .................. | B60B 35/005 280/124.116 |
| 2017/0204597 A1 | * | 7/2017 | McDonald .............. | E04C 3/083 |
| 2018/0118408 A1 | * | 5/2018 | Bradley ............... | B65D 19/385 |

* cited by examiner

*Primary Examiner* — Kiran B Patel
(74) *Attorney, Agent, or Firm* — Woodard, Emhardt, Moriarty, McNett & Henry LLP

(57) ABSTRACT

A vehicle skid plate assembly includes multiple skid plate sections having closed apertures adapted to receive mounting bolts. The various skid plate sections are adapted to abut each other in a manner effective for the closed mounting bolt apertures of adjacent sections to overlay a single, linear array of bolt holes.

2 Claims, 7 Drawing Sheets

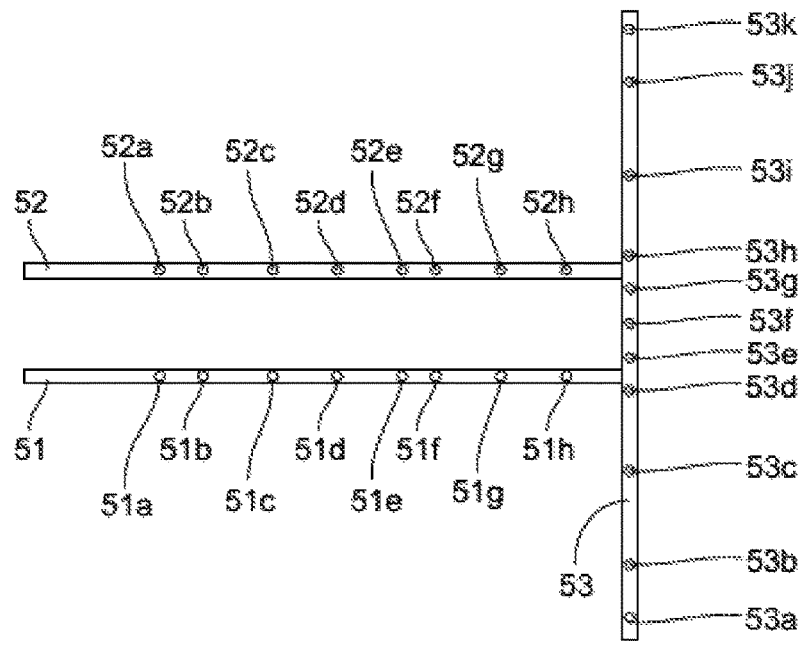
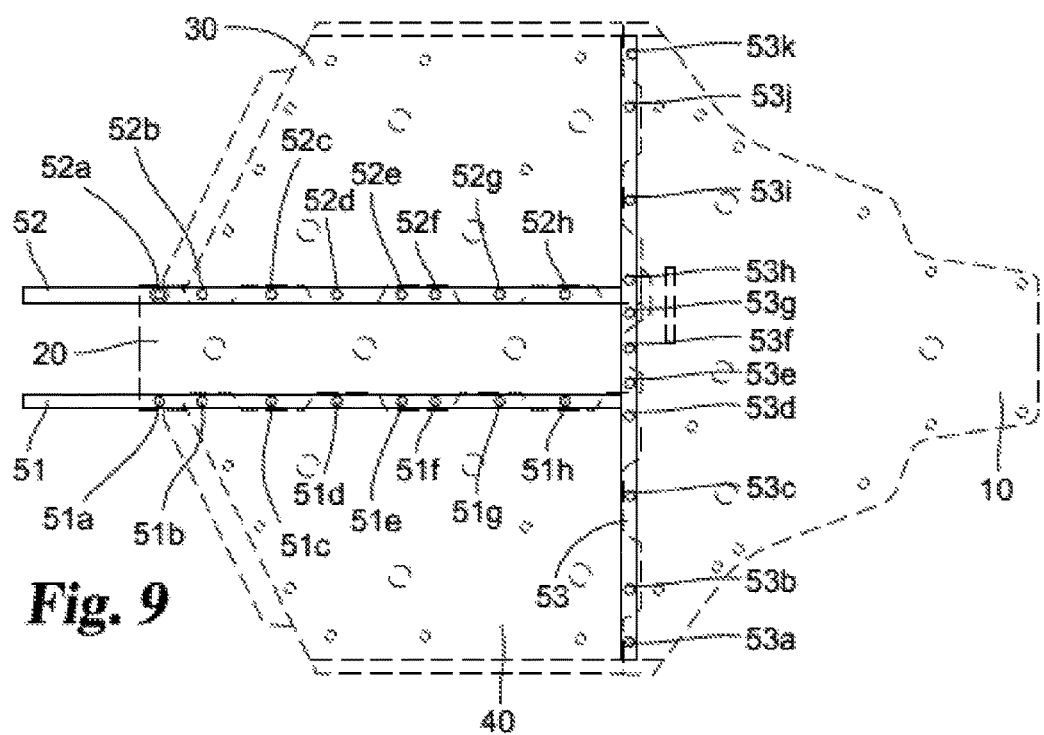

ATV/UTV SKID PLATE ASSEMBLY

FIELD OF THE INVENTION

The present invention relates generally to all-terrain vehicles (ATVs) and utility task vehicles (UTVs), and more particularly to a skid plate assembly for use on an ATV or UTV.

BACKGROUND TO THE INVENTION

ATVs and UTVs are off-road vehicles that typically travel on low-pressure tires and are designed for recreational off-road use. Smooth trails are not the norm, and many ATVs and UTVs are driven over creek beds, rutted trails, or other rough terrain where rocks, fallen trees, deep mud, etc. are frequently encountered. It is therefore common for the underside of the vehicle to scrape or otherwise come in contact with the ground or other obstacles that the driver is seeking to traverse.

A skid plate is provided on ATVs and UTVs to protect the underside of the vehicle. However, skid plates are frequently made in multiple sections, and the edges between adjacent sections are prone to catch on rocks, logs, etc., when driving over rough terrain. This may cause one or both of the skid plate sections to bend away from the vehicle. Once a plate section has been bent, it is even more susceptible to catching on foreign objects, and is therefore increasingly likely to bend further. Once that pattern begins it is not long until the skid plate is pulled from the vehicle or is otherwise not useful for the purpose for which it is intended.

A need therefore exists for an improved multi-plate ATV/UTV skid plate assembly that protects the underside of a vehicle and is resistant to bending and/or separation along plate edges and seams. The present invention addresses that need.

SUMMARY OF THE INVENTION

One aspect of the present invention provides a vehicle skid plate assembly with multiple skid plate sections having closed apertures adapted to receive mounting bolts. The various skid plate sections are adapted to abut each other in a manner effective for the closed mounting bolt apertures of adjacent sections to overlay a single, linear array of bolt holes.

One embodiment of the present invention includes a skid plate assembly mounted to an ATV or UTV frame. The frame comprises a pair of linear longitudinal frame members and a linear cross-frame member. Each of the three frame members includes a linear array of bolt holes.

A skid plate assembly is mounted to the vehicle frame. The skid plate assembly comprises multiple skid plate sections, and each skid plate section has at least one edge portion that includes a linear array of closed apertures adapted to receive mounting bolts.

The edges of adjacent skid plate sections abut in a manner such that the linear array of closed mounting bolt apertures of one skid plate section overlays a first set of members of one of the linear arrays of frame bolt holes, and the linear array of closed mounting bolt apertures of an adjacent skid plate section overlays a second set of members of that same linear array of frame bolt holes. The arrangement allows the linear array of bolt holes provided in one of the frame member to be used to mount bolts passing through the linear array of closed apertures provided in two or more skid plate sections.

In one embodiment four skid plate sections are mounted to three frame members such that one line of bolts connects the left skid plate section and the center skid plate section to the first linear longitudinal frame member, one line of bolts connects the right skid plate section and the center skid plate section to the second linear longitudinal frame member, and one line of bolts connects the forward skid plate section, the center skid plate section, the left skid plate section, and the right skid plate section to the linear cross-frame member.

DESCRIPTION OF THE DRAWINGS

FIG. 8 shows a top perspective view of the frame member of the ATV/UTV skid plate assembly of FIG. 1.

FIG. 9 shows a bottom plan view of the ATV/UTV skid plate assembly of FIG. 1, with the skid plate sections being shown in phantom, showing the linear arrays of bolts used to connect the skid plate to the vehicle.

DESCRIPTION OF THE PREFERRED EMBODIMENTS

Figure 1:
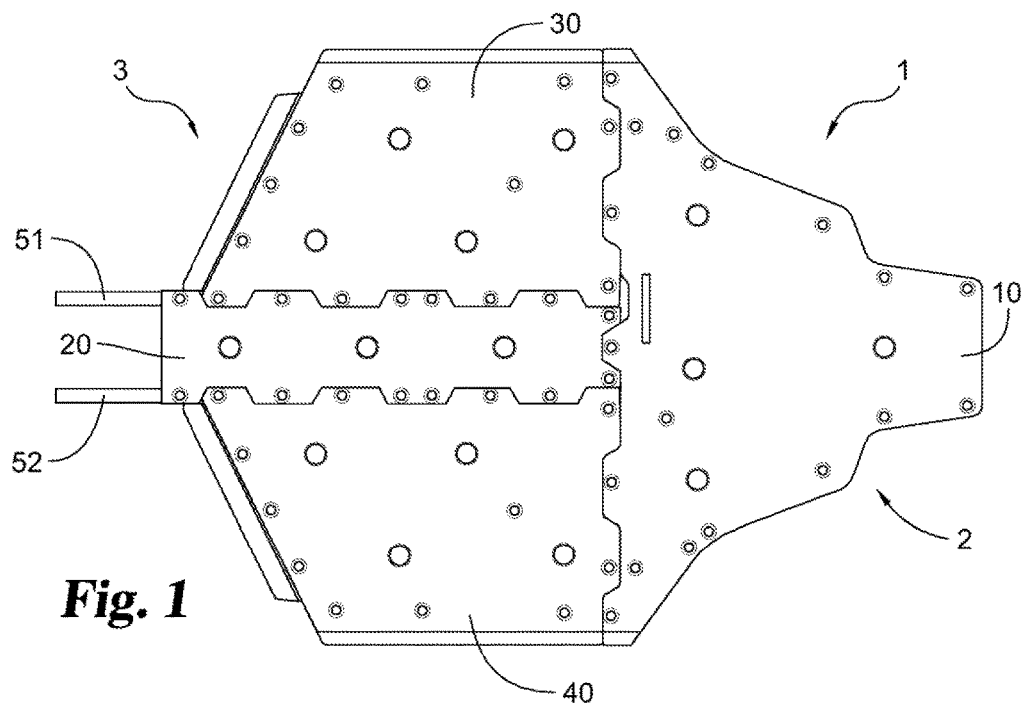
FIG. 1 shows a bottom plan view of an ATV/UTV skid plate assembly according to one embodiment of the present invention.

For the purposes of promoting an understanding of the principles of the invention, reference will now be made to certain embodiments and specific language will be used to describe the same. It will nevertheless be understood that no limitation of the scope of the invention is thereby intended, with such alterations and modifications to the illustrated device being contemplated as would normally occur to one skilled in the art to which the invention relates.

As indicated above, one aspect of the present invention provides a utility task vehicle assembly comprising a vehicle frame and a skid plate assembly. The vehicle frame has a forward end and a rearward end, and comprises a first linear longitudinal frame member, a second linear longitudinal frame member, and a linear cross-frame member. The first linear longitudinal frame member includes a first linear array of bolt holes, and the second linear longitudinal frame member includes a second linear array of bolt holes. The linear cross-frame member includes a third linear array of bolt holes.

A skid plate assembly is mounted to the vehicle frame. The skid plate assembly comprises a forward skid plate section, a center skid plate section, a left skid plate section, and a right skid plate section.

The forward skid plate section has a bottom edge portion bounded by a bottom edge, and includes a linear array of closed apertures adapted to receive mounting bolts. The linear array preferably includes two or more apertures.

The center skid plate section has a forward edge portion bounded by a forward edge, and includes one or more closed apertures adapted to receive mounting bolts. To the extent more than one aperture is included, the apertures are arranged in a line to provide a linear array of apertures. The center skid plate section also has a left-hand edge portion bounded by a left-hand edge, and includes a linear array of closed apertures adapted to receive mounting bolts. The linear array preferably includes two or more apertures. The center skid plate section also has a right-hand edge portion bounded by a right-hand edge, and includes a linear array of closed apertures adapted to receive mounting bolts. The linear array preferably includes two or more apertures.

The left skid plate section has a forward edge portion bounded by a forward edge, and includes one or more closed apertures adapted to receive mounting bolts. To the extent more than one aperture is included, the apertures are arranged in a line to provide a linear array of apertures. The left skid plate section also has a right-hand edge portion bounded by a right-hand edge, and includes a linear array of closed apertures adapted to receive mounting bolts. The linear array preferably includes two or more apertures.

The right skid plate section has a forward edge portion bounded by a forward edge, and includes one or more closed apertures adapted to receive mounting bolts. To the extent more than one aperture is included, the apertures are arranged in a line to provide a linear array of apertures. The right skid plate section also has a left-hand edge portion bounded by a left-hand edge, and includes a linear array of closed apertures adapted to receive mounting bolts. The linear array preferably includes two or more apertures.

The bottom edge of the forward skid plate section abuts the forward edge of the center skid plate section and the forward edge of the left skid plate section and the forward edge of the right skid plate section. The plates abut in a manner such that the linear array of closed mounting bolt apertures of the bottom edge portion of the forward skid plate overlays a first set of members of the third linear array of bolt holes, and in a manner such that the linear array of closed mounting bolt apertures of the forward edge portion of the center skid plate overlays a second set of members of said third linear array bolt holes, and in a manner such that the linear array of closed mounting bolt apertures of the forward edge portion of the left skid plate overlays a third set of members of said third linear array of bolt holes, and in a manner such that the linear array of closed mounting bolt apertures of the forward edge portion of the right skid plate overlays a fourth set of members of said third linear array of bolt holes. Preferably, the first, second, third and fourth sets of members of the third linear array of bolt holes are mutually exclusive sets.

Similarly, the left-hand edge of the center skid plate section abuts the right-hand edge of the left skid plate section, and the right-hand edge of the center skid plate section abuts the left-hand edge of the right skid plate section. Similarly to the abutment of the forward skid plate section with the three other skid plate sections, the center skid plate section abuts against the left- and right-hand skid plate sections in a manner such that the linear array of closed mounting bolt apertures of the left-hand edge portion of the center skid plate overlays a first set of members of the first linear array of bolt holes, and in a manner such that the linear array of closed mounting bolt apertures of the right-hand edge portion of the center skid plate overlays a first set of members of said second linear array bolt holes, and in a manner such that the linear array of closed mounting bolt apertures of the right-hand edge portion of the left skid plate overlays a second set of members of the first linear array of bolt holes, and in a manner such that the linear array of closed mounting bolt apertures of the left-hand edge portion of the right skid plate section overlays a second set of members of the second linear array bolt holes.

The arrangement described above allows the linear array of bolt holes provided in the first longitudinal frame member to be used to mount bolts passing through the linear array of closed apertures provided in the left-hand side of the center skid plate section and to mount bolts passing through the linear array of closed apertures provided in the right-hand side of the left skid plate section. Similarly, the arrangement described above allows the linear array of bolt holes provided in the second longitudinal frame member to be used to mount bolts passing through the linear array of closed apertures provided in the right-hand side of the center skid plate section and to mount bolts passing through the linear array of closed apertures provided in the left-hand side of the right skid plate section. Also, the arrangement described above allows the linear array of bolt holes provided in the third longitudinal frame member to be used to mount bolts passing through the linear array of closed apertures provided in the bottom portion of the forward skid plate section, and to mount bolts passing through the linear array of closed apertures provided in the forward edge portion of the left skid plate section, and to mount bolts passing through the linear array of closed apertures provided in the forward edge portion of the right skid plate section.

Accordingly, the four plates abut so that three lines of bolts are used—one line of bolts connecting the left skid plate section and the center skid plate section to the first linear longitudinal frame member, one line of bolts connecting the right skid plate section and the center skid plate section to the second linear longitudinal frame member, and one line of bolts connecting the forward skid plate section, the center skid plate section, the left skid plate section, and the right skid plate section to the linear cross-frame member.

Another embodiment of the present invention provides a vehicle skid plate assembly, comprising a multiplicity of skid plate sections. The assembly includes:

a) a forward skid plate section having a bottom edge portion bounded by a bottom edge, wherein the bottom edge portion of said forward skid plate section includes one or more closed apertures adapted to receive mounting bolts;

b) a center skid plate section having a forward edge portion bounded by a forward edge, wherein the forward edge portion of said center skid plate section includes one or more closed apertures adapted to receive mounting bolts, a left-hand edge portion bounded by a left-hand edge, wherein the left-hand edge portion of said center skid plate section includes one or more closed apertures adapted to receive mounting bolts, and a right-hand edge portion bounded by a right-hand edge, wherein the right-hand edge portion of said forward center plate section includes one or more closed apertures adapted to receive mounting bolts;

c) a left skid plate section having a forward edge portion bounded by a forward edge, wherein the forward edge portion of said left skid plate section includes one or more closed apertures adapted to receive mounting bolts, and a right-hand edge portion bounded by a right-hand edge, wherein the right-hand edge portion of said left skid plate section includes one or more closed apertures adapted to receive mounting bolts; and d) a right skid plate section having a forward edge portion bounded by a forward edge, wherein the forward edge portion of said right skid plate section includes a one or more closed apertures adapted to receive mounting bolts, and a left-hand edge portion bounded by a left-hand edge, wherein the left-hand edge portion of said right skid plate section includes one or more closed apertures adapted to receive mounting bolts.

The bottom edge of the forward skid plate section is adapted to abut the forward edge of the center skid plate section, the forward edge of the left skid plate section, and the forward edge of the right skid plate section in a manner effective to cause the closed mounting bolt apertures of the bottom edge portion of the forward skid plate and the closed mounting bolt apertures of the forward edge portion of the center skid plate and the closed mounting bolt apertures of the forward edge portion of the left skid plate and the closed mounting bolt apertures of the forward edge portion of the right skid plate to overlay a first linear array of bolt holes. The left-hand edge of the center skid plate section is adapted to abut the right-hand edge of the left skid plate section in a manner effective to cause the closed mounting bolt apertures of the left-hand edge portion of the center skid plate and the closed mounting bolt apertures of the right-hand edge portion of the left skid plate to overlay a second linear array of bolt holes. The right-hand edge of the center skid plate section is adapted to abut the left-hand edge of the right skid plate section in a manner effective to cause the closed mounting bolt apertures of the right-hand edge portion of the center skid plate and the closed mounting bolt apertures of the left-hand edge portion of the right skid plate to overlay a third linear array of bolt holes.

In another embodiment there is provided a utility task vehicle assembly, comprising:
  a) a vehicle frame having a forward end and a rearward end, said vehicle frame including a first linear longitudinal frame member, a second linear longitudinal frame member, and a linear cross-frame member, with the first linear longitudinal frame member including a first linear array of bolt holes, with the second linear longitudinal frame member including a second linear array of bolt holes, and with the linear cross-frame member including a third linear array of bolt holes; and
  b) a skid plate assembly mounted to said frame, said skid plate assembly comprising:
    i) a forward skid plate section having a bottom edge portion bounded by a bottom edge, wherein the bottom edge portion of said forward skid plate section includes a linear array of two or more closed apertures adapted to receive mounting bolts;
    ii) a center skid plate section having a forward edge portion bounded by a forward edge, wherein the forward edge portion of said center skid plate section includes at least one closed aperture adapted to receive mounting bolts, a left-hand edge portion bounded by a left-hand edge, wherein the left-hand edge portion of said center skid plate section includes a linear array of two or more closed apertures adapted to receive mounting bolts, and a right-hand edge portion bounded by a right-hand edge, wherein the right-hand edge portion of said forward center plate section includes a linear array of two or more closed apertures adapted to receive mounting bolts;
    iii) a left skid plate section having a forward edge portion bounded by a forward edge, wherein the forward edge portion of said left skid plate section includes a linear array of wo or more closed apertures adapted to receive mounting bolts, and a right-hand edge portion bounded by a right-hand edge, wherein the right-hand edge portion of said left skid plate section includes a linear array of two or more closed apertures adapted to receive mounting bolts; and
    iv) a right skid plate section having a forward edge portion bounded by a forward edge, wherein the forward edge portion of said right skid plate section includes a linear array of two or more closed apertures adapted to receive mounting bolts, and a left-hand edge portion bounded by a left-hand edge, wherein the left-hand edge portion of said right skid plate section includes a linear array of two or more closed apertures adapted to receive mounting bolts;
  wherein the bottom edge of the forward skid plate section abuts the forward edge of the center skid plate section, the forward edge of the left skid plate section, and the forward edge of the right skid plate section so that the linear array of closed mounting bolt apertures of the bottom edge portion of the forward skid plate overlays a first set of members of the third linear array of bolt holes, at least one or the closed mounting bolt apertures of the forward edge portion of the center skid plate overlays a second set of members of said third linear array bolt holes, the linear array of closed mounting bolt apertures of the forward edge portion of the left skid plate overlays a third set of members of said third linear array of bolt holes, and the linear array of closed mounting bolt apertures of the forward edge portion of the right skid plate overlays a fourth set of members of said third linear array of bolt holes, and
  wherein the left-hand edge of the center skid plate section abuts the right-hand edge of the left skid plate section so that the linear array of two or more closed mounting bolt apertures of the left-hand edge portion of the center skid plate overlays a first set of members of said first linear array of bolt holes, and the linear array of two or more closed mounting bolt apertures of the right-hand edge portion of the left skid plate overlays a second set of members of the first linear array of bolt holes, and
  wherein the right-hand edge of the center skid plate section abuts the left-hand edge of the right skid plate section so that the linear array of two or more closed mounting bolt apertures of the left-hand edge portion of the center skid plate overlays a first set of members of the second linear array of bolt holes, and the linear array of two or more closed mounting bolt apertures of the left-hand edge portion of the right skid plate overlays a second set of members of the second linear array of bolt holes.

In another embodiment there is provided a utility task vehicle assembly comprising two or more skid plate sections and one or more frame members; wherein at least one frame member includes a first linear array of bolt holes adapted to receive mounting bolts, and wherein one of said two or more skid plate sections includes a first linear array of two or more closed apertures adapted to receive mounting bolts, and another of said two or more skid plate sections includes a second linear array of two or more closed apertures adapted to receive mounting bolts. Said first of said two or more skid plate sections abuts said second of said two or more skid plate sections so that the linear array of two or more closed mounting bolt apertures of the first skid plate section overlays a first set of members of the first linear array of bolt holes, and the linear array of two or more closed mounting bolt apertures of the second skid plate section overlays a second set of members of the first linear array of bolt holes.

In another embodiment there is provided a utility task vehicle assembly comprising three or more skid plate sections and two or more frame members. A first of said two or more frame members includes a first linear array of bolt holes adapted to receive mounting bolts, and a second of said two or more frame member includes a second linear array of bolt holes adapted to receive mounting bolts. A first of the three or more skid plate sections includes a first linear array of two or more closed apertures adapted to receive mounting bolts. A second of the three or more skid plate sections includes a first linear array of two or more closed apertures adapted to receive mounting bolts, and a second linear array of two or more closed apertures adapted to receive mounting bolts, with the first linear array preferably being perpendicular to the second linear array. A third of the three or more skid plate sections includes a first linear array of two or more closed apertures adapted to receive mounting bolts, and a second linear array of two or more closed apertures adapted to receive mounting bolts, with the first linear array preferably being perpendicular to the second linear array. The first of said three or more skid plate sections abuts the second of said three or more skid plate sections so that the first linear array of two or more closed mounting bolt apertures of the first skid plate section overlays a first set of members of the first linear array of bolt holes, and the first linear array of two or more closed mounting bolt apertures of the second skid plate section overlays a second set of members of the first linear array of bolt holes. The first of said three or more skid plate sections abuts the third of said three or more skid plate sections so that the first linear array of two or more closed mounting bolt apertures of the third skid plate section overlays a third set of members of the first linear array of bolt holes. The second of the three or more skid plate sections abuts the third of the three or more skid plate sections so that the second linear array of two or more closed mounting bolt apertures of the second skid plate section overlays a first set of members of the second linear array of bolt holes, and the second linear array of two or more closed mounting bolt apertures of the third skid plate section overlays a second set of members of the second linear array of bolt holes.

Referring now to the drawings, FIG. 1 shows one embodiment of the utility task vehicle assembly of the present invention. Assembly 1 includes forward skid plate section 10, center skid plate section 20, left skid plate section 30, and right skid plate section 40. First linear longitudinal frame member 51 and second linear longitudinal frame member 52 are also shown.

Figure 2:
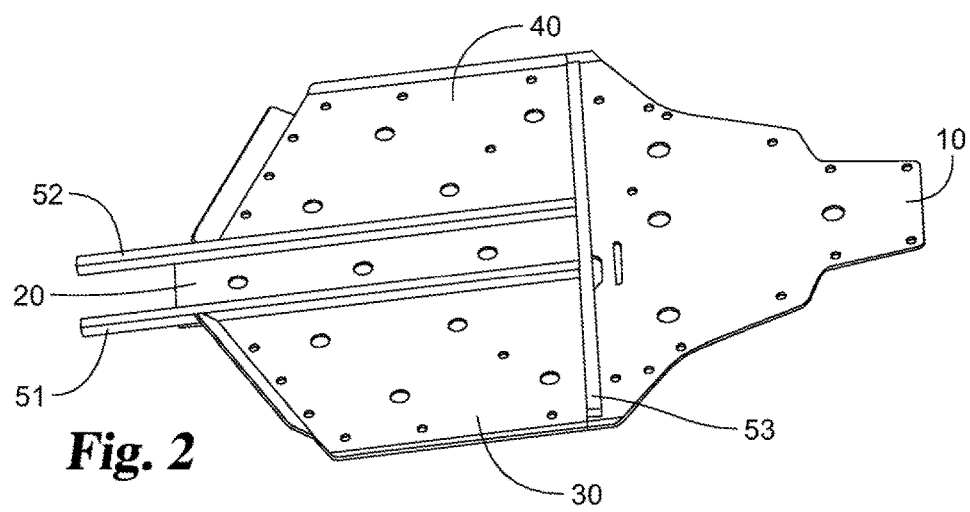
FIG. 2 shows a top perspective view of the ATV/UTV skid plate assembly of FIG. 1.

FIG. 2 shows another view of the utility task vehicle assembly of FIG. 1. Assembly 1 includes forward skid plate section 10, center skid plate section 20, left skid plate section 30, and right skid plate section 40. First linear longitudinal frame member 51 and second linear longitudinal frame member 52 are also shown, as is linear cross-frame member 53.

Figure 3:
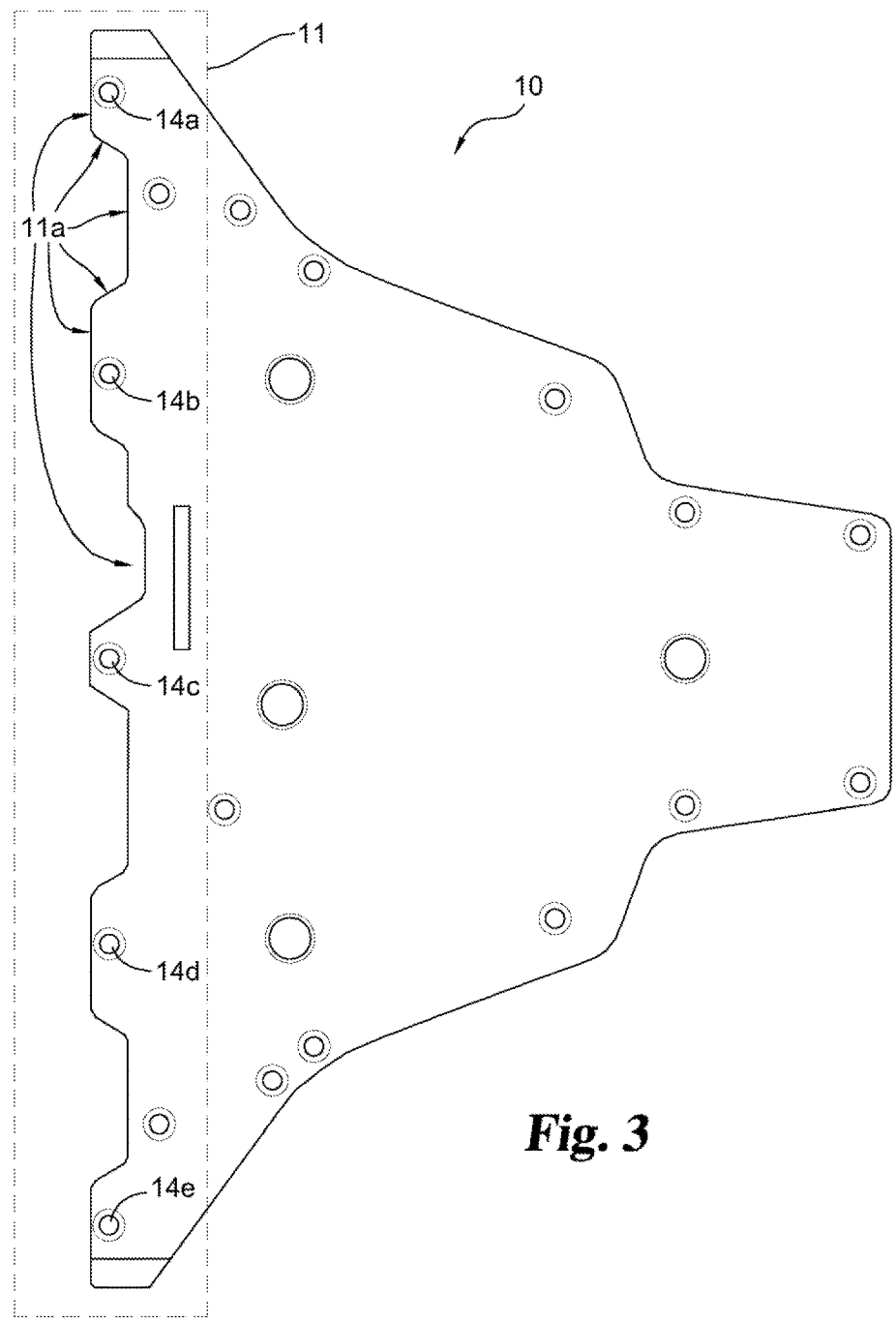
FIG. 3 shows a bottom plan view of the front ATV/UTV skid plate section of the ATV/UTV skid plate assembly of FIG. 1.

FIG. 3 shows a bottom plan view of forward skid plate section 10. Forward skid plate section 10 has a bottom edge portion 11 bounded by a bottom edge 11a, wherein the bottom edge portion of said forward skid plate section includes a linear array 14a-14e of closed apertures adapted to receive mounting bolts. Bottom edge 11a extends all of the way along the side of the section, with the reference number provided in the figure identifying only some representative portions of the edge.

As used herein, a closed aperture is an aperture that is surrounded by solid material all of the way around the aperture. The closed apertures of the present invention are not open to one side, as apertures used in some prior art skid plate assemblies may be. The use of closed apertures provides a more secure mounting that is less prone to being pulled from the frame when a skid plate edge contacts the ground.

Figure 4:
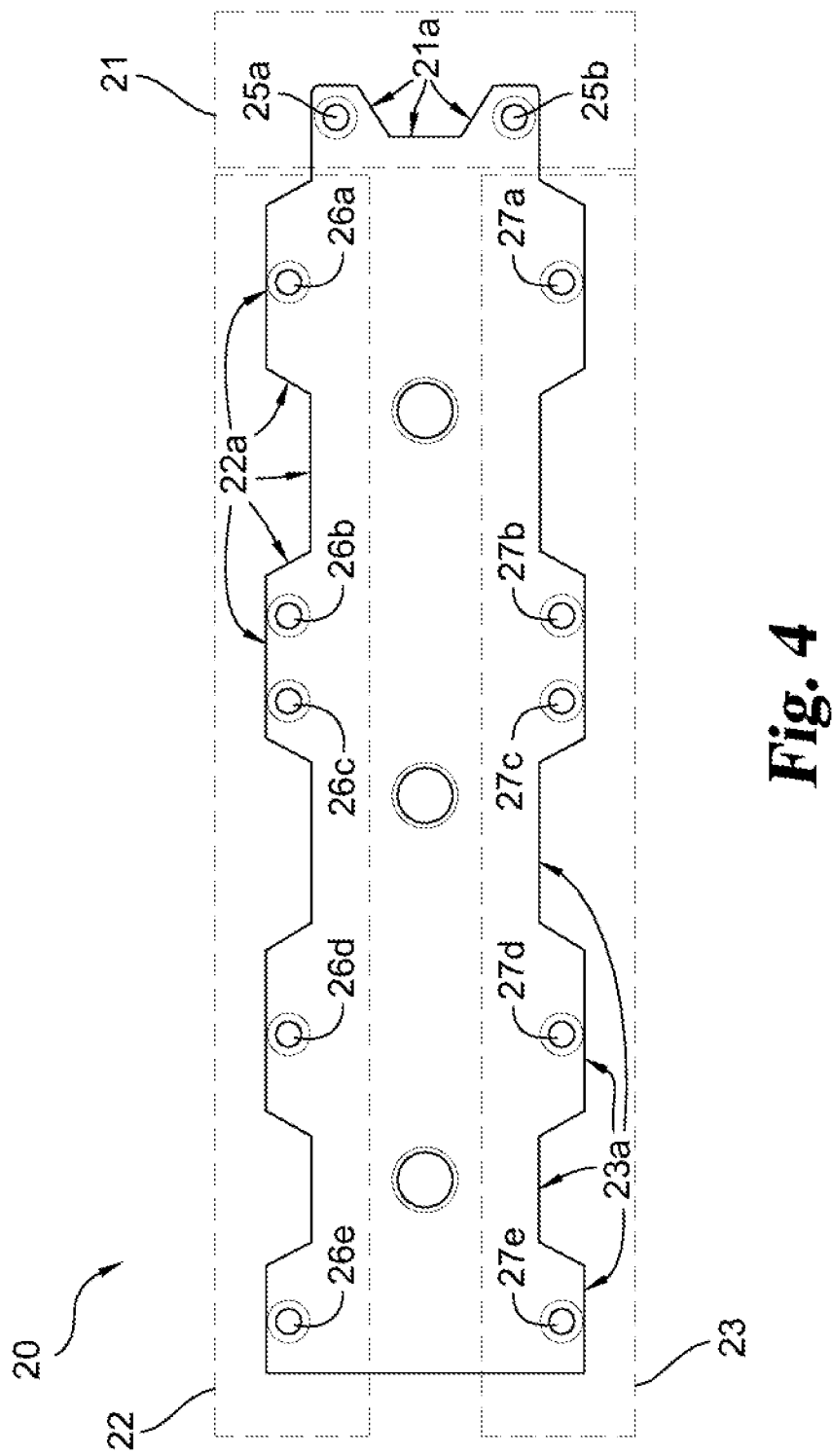
FIG. 4 shows a bottom plan view of the center ATV/UTV skid plate section of the ATV/UTV skid plate assembly of FIG. 1.

FIG. 4 shows a bottom plan view of center skid plate section 20. Center skid plate section 20 has a forward edge portion 21 bounded by a forward edge 21a. Forward edge portion 21 includes a linear array 25a and 25b of closed apertures adapted to receive mounting bolts. Center skid plate section 20 also has a left-hand edge portion 22 bounded by a left-hand edge 22a. Left-hand edge portion 22 of center skid plate section 20 includes a linear array 26a-26e of closed apertures adapted to receive mounting bolts. Center skid plate section 20 also has a right-hand edge portion 23 bounded by a right-hand edge 23a. Right-hand edge portion 23 of center plate section 20 includes a linear array 27a-27e of closed apertures adapted to receive mounting bolts. As with FIG. 3, forward edge 21a, left-hand edge 22a, and right-hand edge 23a each extend all of the way along the side of the section, with the reference numbers provided in the figure identifying only some representative portions of the edges.

As with forward skid plate section 10, center skid plate section 20 includes closed apertures that are surrounded by solid material all of the way around the aperture. The closed apertures are not open to one side, and provide a more secure mounting that is less prone to being pulled from the frame when a skid plate edge contacts the ground.

Figure 5:
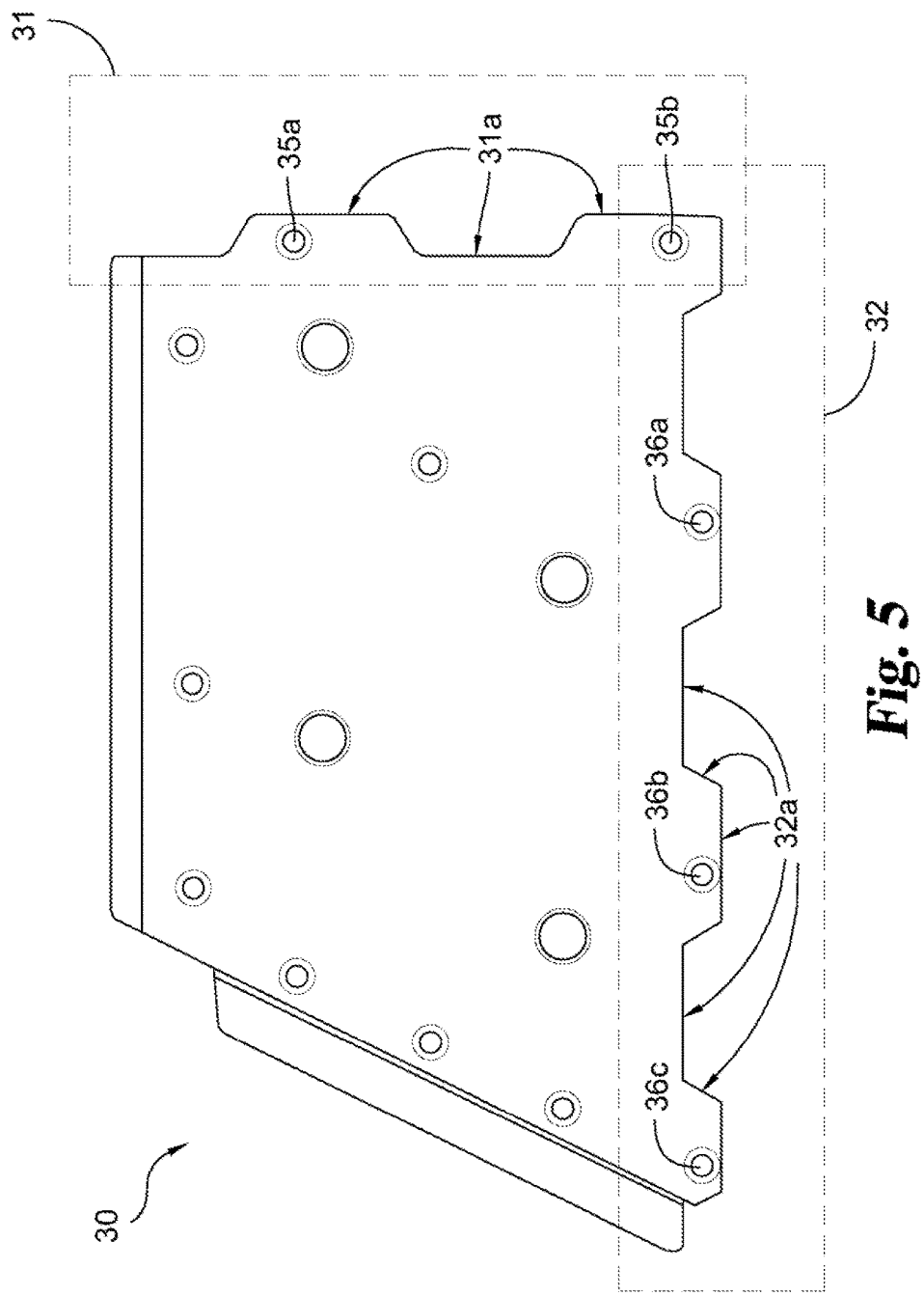
FIG. 5 shows a bottom plan view of the left ATV/UTV skid plate section of the ATV/UTV skid plate assembly of FIG. 1.

FIG. 5 shows a bottom plan view of left skid plate section 30. Left skid plate section 30 has a forward edge portion 31 bounded by a forward edge 31a. Forward edge portion 31 includes a linear array 35a and 35b of closed apertures adapted to receive mounting bolts. Left skid plate section 30 also has a right-hand edge portion 32 bounded by a right-hand edge 32a. Right-hand edge portion 32 of left skid plate section 30 includes a linear array 36a-36e of closed apertures adapted to receive mounting bolts. As with FIGS. 3 and 4, forward edge 31a and right-hand edge 33a each extend all of the way along the side of the section, with the reference numbers provided in the figure identifying only some representative portions of the edges.

As with the other skid plate sections, left skid plate section 30 includes closed apertures that are surrounded by solid material all of the way around the aperture. The closed apertures are not open to one side, and provide a more secure mounting that is less prone to being pulled from the frame when a skid plate edge contacts the ground.

Figure 6:
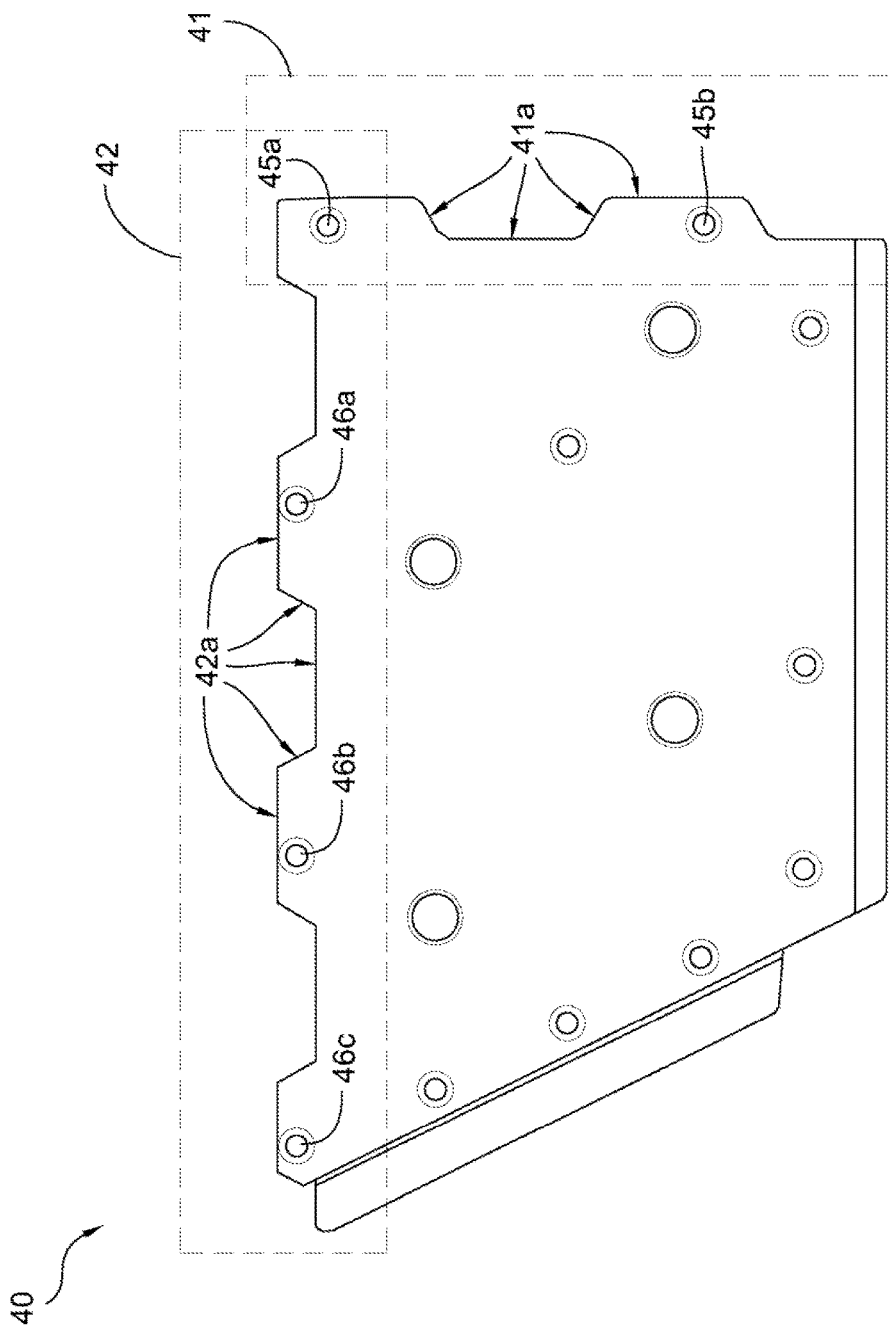
FIG. 6 shows a bottom plan view of the right ATV/UTV skid plate section of the ATV/UTV skid plate assembly of FIG. 1.

FIG. 6 shows a bottom plan view of right skid plate section 40. Right skid plate section 40 has a forward edge portion 41 bounded by a forward edge 41a. Forward edge portion 41 includes a linear array 45a and 45b of closed apertures adapted to receive mounting bolts. Right skid plate section 40 also has a left-hand edge portion 42 bounded by a left-hand edge 42a. Left-hand edge portion 42 of right skid plate section 40 includes a linear array 46a-46e of closed apertures adapted to receive mounting bolts. As with FIGS. 3, 4, and 5, forward edge 41a and left-hand edge 42a each extend all of the way along the side of the section, with the reference numbers provided in the figure identifying only some representative portions of the edges.

As with the other skid plate sections, right skid plate section 40 includes closed apertures that are surrounded by solid material all of the way around the aperture. The closed apertures are not open to one side, and provide a more secure mounting that is less prone to being pulled from the frame when a skid plate edge contacts the ground.

Figure 7:
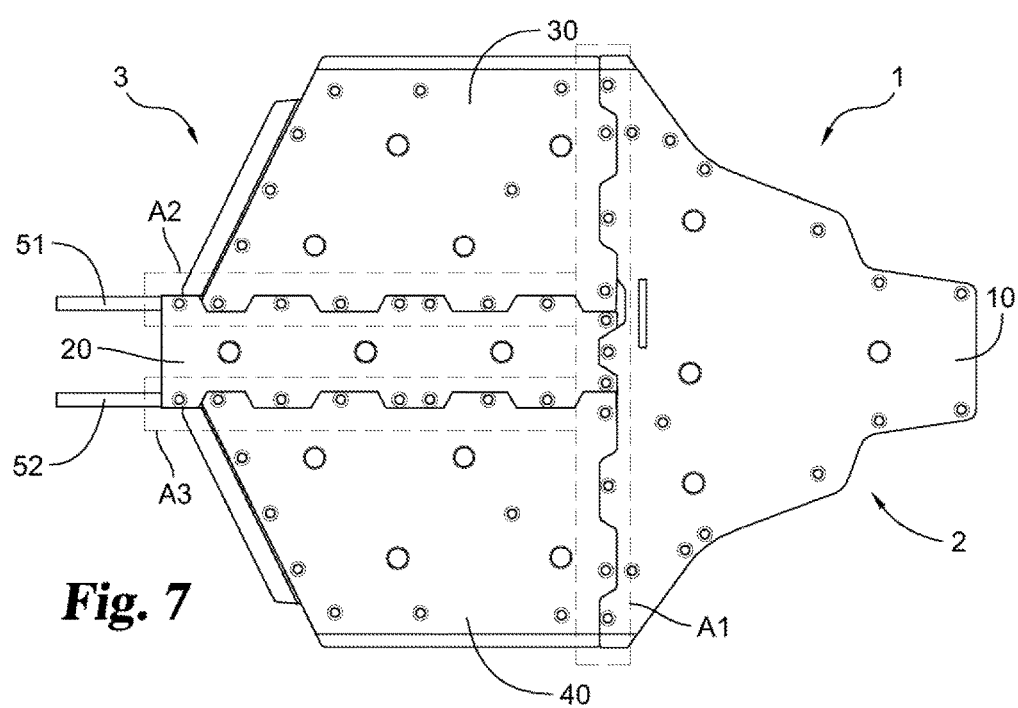
FIG. 7 shows a bottom plan view of the ATV/UTV skid plate assembly of FIG. 1, showing the linear arrays of bolts used to connect the skid plate to the vehicle.

As shown in FIGS. 1 and 7, the bottom edge 11a of forward skid plate section 10 abuts the forward edge 21a of center skid plate section 20 in a manner such that the linear array of closed mounting bolt apertures of the bottom edge portion of the forward skid plate overlays a first set of members of the third linear array of bolt holes, and the linear array of closed mounting bolt apertures of the bottom edge portion of the forward skid plate overlays a first set of members of the third linear array of bolt holes. Similarly, the linear array of closed mounting bolt apertures of the forward edge portion of the center skid plate overlays a second set of members of said third linear array bolt holes, the linear array of closed mounting bolt apertures of the forward edge portion of the left skid plate overlays a third set of members of said third linear array of bolt holes, and the linear array of closed mounting bolt apertures of the forward edge portion of the right skid plate overlays a fourth set of members of said third linear array of bolt holes. This provides a linear array A1 of connections where bolts pass though the closed mounting bolt apertures and are connected to the frame in a manner effective to secure the skid plate section to the frame.

In the same way, the left-hand edge of the center skid plate section abuts the right-hand edge of the left skid plate section so that the linear array of closed mounting bolt apertures of the left-hand edge portion of the center skid plate overlays a first set of members of said first linear array of bolt holes, and the linear array of closed mounting bolt apertures of the right-hand edge portion of the left skid plate overlays a second set of members of the first linear array of bolt holes. This provides a linear array A2 of connections where bolts pass though the closed mounting bolt apertures and are connected to the frame in a manner effective to secure the skid plate section to the frame.

Also in the same way, the right-hand edge of the center skid plate section abuts the left-hand edge of the right skid plate section so that the linear array of closed mounting bolt apertures of the left-hand edge portion of the center skid plate overlays a first set of members of the second linear array of bolt holes, and the linear array of closed mounting bolt apertures of the left-hand edge portion of the right skid plate overlays a second set of members of the second linear array of bolt holes. This provides a linear array A3 of connections where bolts pass though the closed mounting bolt apertures and are connected to the frame in a manner effective to secure the skid plate section to the frame.

FIG. 8 shows the vehicle frame. Vehicle frame 50 has a forward end and a rearward end, and comprises a first linear longitudinal frame member 51, a second linear longitudinal frame member 52, and a linear cross-frame member 53. The first linear longitudinal frame member includes a first linear array 51a-51h of bolt holes, and the second linear longitudinal frame member includes a second linear array 52a-52h of bolt holes. The linear cross-frame member includes a third linear array 53a-53k of bolt holes.

FIG. 9 shows the bottom plan view previously shown as FIG. 1, with the skid plate sections being shown in phantom, thus showing the frame and the linear arrays of bolts holes and closed skid plate apertures used to connect the skid plate to the vehicle.

In the illustrated embodiment the skid plate sections are shaped such that adjacent edges have alternating tabs or extended portions as shown in the drawings. In alternative embodiments adjacent edges may have a different shape. However, as illustrated in the drawings and written description it is important for the relevant skid plate section edges to be shaped such that closed mounting bolt apertures may be provided therein in a manner effective to allow adjacent plates to abut each other in a manner effective to use a single, linear array of bolt holes to mount portions of each of the two skid plate sections.

While the invention has been illustrated and described in detail in the drawings and foregoing description, the same is to be considered as illustrative and not restrictive in character, it being understood that only certain preferred embodiments have been shown and described, and that all changes and modifications that come within the spirit of the invention are desired to be protected.

Additionally, it is to be appreciated that the present invention may comprise or consist essentially of any or all of the described or illustrated elements. Further, any or all of the features, elements, and/or embodiments disclosed herein may be combined with any or all of the other features, elements, and/or embodiments disclosed herein to provide an invention that comprises or consists essentially of such features, elements, and/or embodiments.

The grammatical device "and/or" (such as in "A and/or B") is used in this disclosure to mean A alone, or B alone, or both A and B.

The invention claimed is:

1. A utility task vehicle assembly comprising two or more skid plate sections and one or more frame members; wherein at least one frame member includes a first linear array of bolt holes adapted to receive mounting bolts, and wherein one of said two or more skid plate sections includes a first linear array of two or more closed apertures adapted to receive mounting bolts, and another of said two or more skid plate sections includes a first linear array of two or more closed apertures adapted to receive mounting bolts; wherein a first of said two or more skid plate sections abuts a second of said two or more skid plate sections so that the first linear array of two or more closed mounting bolt apertures of said first of said two or more skid plate sections overlays a first set of members of the first linear array of bolt holes, and the first linear array of two or more closed mounting bolt apertures of said second of said two or more skid plate section overlays a second set of members of the first linear array of bolt holes.

2. A utility task vehicle assembly according to claim 1 wherein the assembly comprises three or more skid plate sections and two or more frame members;
   wherein a first of said two or more frame members includes a first linear array of bolt holes adapted to receive mounting bolts; and
   wherein a second of said two or more frame member includes a second linear array of bolt holes adapted to receive mounting bolts; and
   wherein a first of said three or more skid plate sections includes a first linear array of two or more closed apertures adapted to receive mounting bolts; and
   wherein a second of said three or more skid plate sections includes a first linear array of two or more closed apertures adapted to receive mounting bolts, and a second linear array of two or more closed apertures adapted to receive mounting bolts, wherein said first linear array is perpendicular to said second linear array; and
   wherein a third of said three or more skid plate sections includes a first linear array of two or more closed apertures adapted to receive mounting bolts, and a second linear array of two or more closed apertures adapted to receive mounting bolts, wherein said first linear array is perpendicular to said second linear array; and wherein said first of said three or more skid plate sections abuts said second of said three or more skid plate sections so that said first linear array of two or more closed mounting bolt apertures of the first skid plate section overlays a first set of members of the first linear array of bolt holes, and said first linear array of two or more closed mounting bolt apertures of the second skid plate section overlays a second set of members of the first linear array of bolt holes; and wherein said first of said three or more skid plate sections abuts said third of said three or more skid plate sections so that said first linear array of two or more closed mounting bolt apertures of the third skid plate section overlays a third set of members of the first linear array of bolt holes; and wherein said second of said three or more skid plate sections abuts said third of said three or more skid plate sections so that said second linear array of two or more closed mounting bolt apertures of the second skid plate section overlays a first set of members of the second linear array of bolt holes, and said second linear array of two or more closed mounting bolt apertures of the third skid plate section overlays a second set of members of the second linear array of bolt holes.

* * * * *